United States Patent [19]
Fan

[11] Patent Number: 5,794,525
[45] Date of Patent: Aug. 18, 1998

[54] COOKING DEVICE

[76] Inventor: Chi-Po Fan, No. 1, Alley 1, Lane 226, Chung-Hwa Road, Sec. 4, Hsinchu City, Taiwan

[21] Appl. No.: 968,226

[22] Filed: Nov. 12, 1997

[51] Int. Cl.⁶ .................. A47J 27/00; A47J 27/04; A47J 37/00
[52] U.S. Cl. .................. 99/413; 99/417; 99/446; 99/448; 99/450; 126/20; 126/369; 219/401
[58] Field of Search .................. 99/403, 410–418, 99/448, 450, 449, 400, 401, 444–446; 126/20, 369, 373, 377, 348; 210/469, 475, 477; 219/401, 441, 442; 426/510, 511, 523, 438

[56] References Cited

U.S. PATENT DOCUMENTS

| | | | |
|---|---|---|---|
| 77,702 | 5/1868 | Zopff | 126/369 |
| 2,932,293 | 4/1960 | Russieur | 126/369 |
| 3,808,963 | 5/1974 | Ludena | 99/417 |
| 4,106,486 | 8/1978 | Lee | 126/369 |
| 4,397,298 | 8/1983 | Abell | 126/369 |
| 4,401,017 | 8/1983 | Feld | 99/413 |
| 4,509,412 | 4/1985 | Whittenburg et al. | 99/446 X |
| 4,626,352 | 12/1986 | Massey et al. | 210/469 |
| 5,076,155 | 12/1991 | Golob | 99/450 X |
| 5,235,904 | 8/1993 | Ludena | 99/417 X |
| 5,287,798 | 2/1994 | Takeda | 99/413 |
| 5,400,701 | 3/1995 | Sham | 99/410 |
| 5,584,235 | 12/1996 | DuBois et al. | 99/413 |

*Primary Examiner*—Timothy F. Simone
*Attorney, Agent, or Firm*—Kenneth Q. Lao

[57] ABSTRACT

A cooking device includes a heater which receives and supports thereon a food container which is adapted to receive and hold therein food to be cooked. The food container includes a cylindrical casing having a top opening and a bottom on which a raised portion with a steam passage is formed. The steam passage has an exit opening at a location higher than the top opening of the casing. A cover is provided to close the open top of the casing. The heater includes a base inside which a water vessel is provided to receive and contain therein a predetermined amount of water. A heating element is provided around the water vessel to heat the water therein for generation of steam. The food container is configured to be fit into the water vessel to define a sealed space therein so that the steam generated inside the water vessel is only allowed to escape out of the water vessel via the steam passage and into the food container to heat and cook the food contained therein and to form a soup with the cooked food when the steam is cooled and condensed into a distilled water which mixes with the food.

3 Claims, 4 Drawing Sheets

COOKING DEVICE

FIELD OF THE INVENTION

The present invention relates to a cooking device and in particular to a cooking device using steam to heat and cook food so as to preserve the original taste of the food and to provide a safer, cleaner and less contaminated cooked food.

BACKGROUND OF THE INVENTION

There are a variety of cooking appliances and devices available in the market. One of the conventional cooking devices cooks food by mixing food and water together and heating the bottom of the cooking device. The food may be cooked very quickly in this way. However, since there is a great amount of water mixed with the food, the original taste of the food cannot be preserved. Furthermore, since such water that is added to the cooking device to mix with the food to be cooked may comprise some contaminants, no matter how small the quantity it has. Such contaminants may be toxicant to the human bodies.

Thus, it is desirable to provide a cooking device that may preserve the original taste of the food being cooked and that is capable to remove the contaminants that are contained in the water to be mixed with the food cooked so as to overcome the problems encountered in the prior art cooking devices.

SUMMARY OF THE INVENTION

Therefore, the principal object of the present invention is to provide a cooking device which is capable to preserve the original taste of the food.

Another object of the present invention is to provide a cooking device in which the contaminant that is possibly contained in the water to be added to the food is removed before the water is mixed with the food so as to provide a safer and cleaner cooked food.

To achieve the above objects, in accordance with the present invention, there is provided a cooking device comprising a heater which receives and supports thereon a food container which is adapted to receive and hold therein food to be cooked. Thee food container comprises a cylindrical casing having a top opening and a bottom on which a raised portion with a steam passage extending therethrough is formed. The steam passage has an exit opening at a location higher than the top opening of the casing. A cover is provided to close the open top of the casing. The heater comprises a container-like base inside which a water vessel is provided to receive and contain therein a predetermined amount of water. A heating element is provided around the water vessel to heat the water therein for generation of steam. The food container is configured to be fit into the water vessel to define a sealed space therein so that the steam generated inside the water vessel is only allowed to escape out of the water vessel via the steam passage and into the food container to heat and cook the food contained therein and to form a soup with the cooked food when the steam is cooled and condensed into a distilled water which mixes with the food.

BRIEF DESCRIPTION OF THE DRAWINGS

The present invention will be better understood from the following description of a preferred embodiment thereof with reference to the attached drawings, wherein.

DETAILED DESCRIPTION OF THE PREFERRED EMBODIMENT

Figure 1:
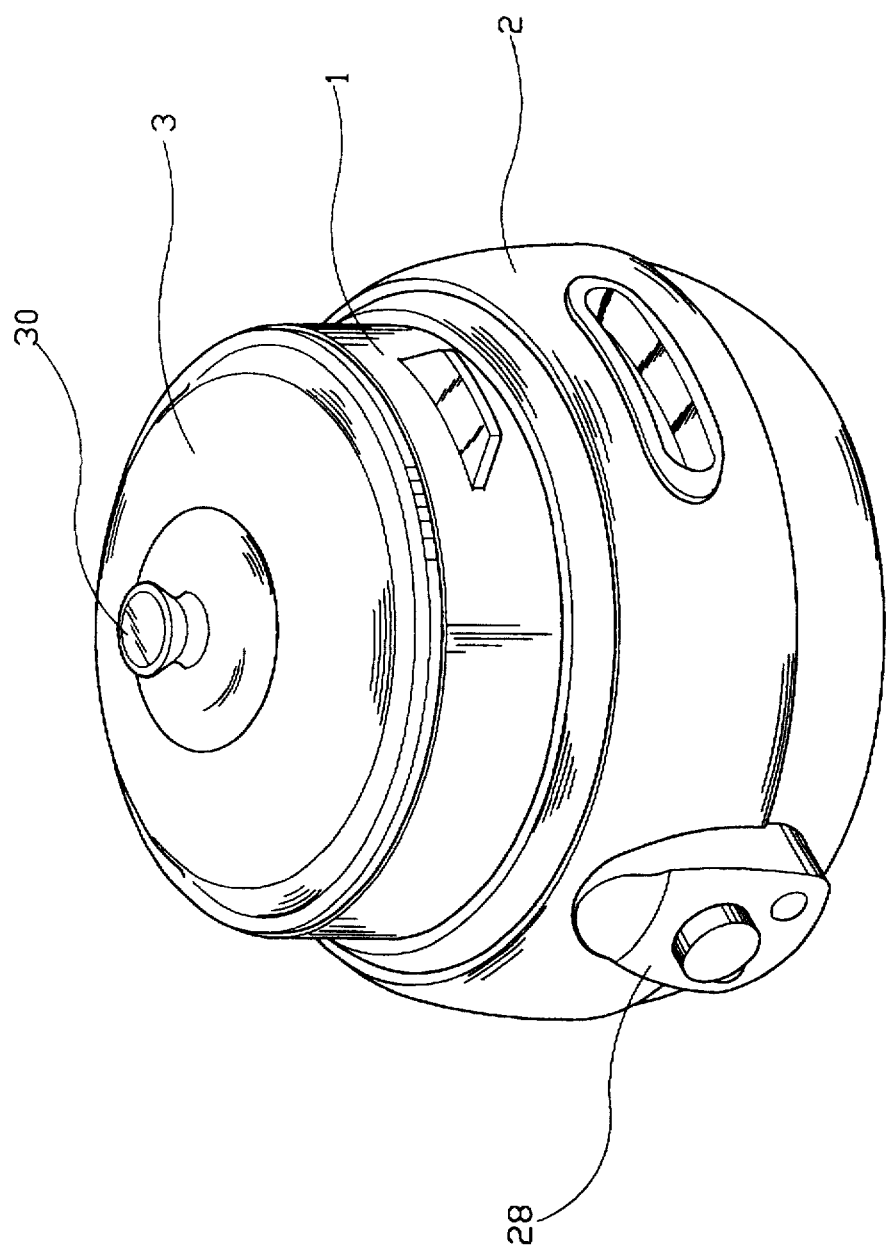
FIG. 1 is a perspective view showing a cooking device constructed in accordance with the present invention.
Figure 2:
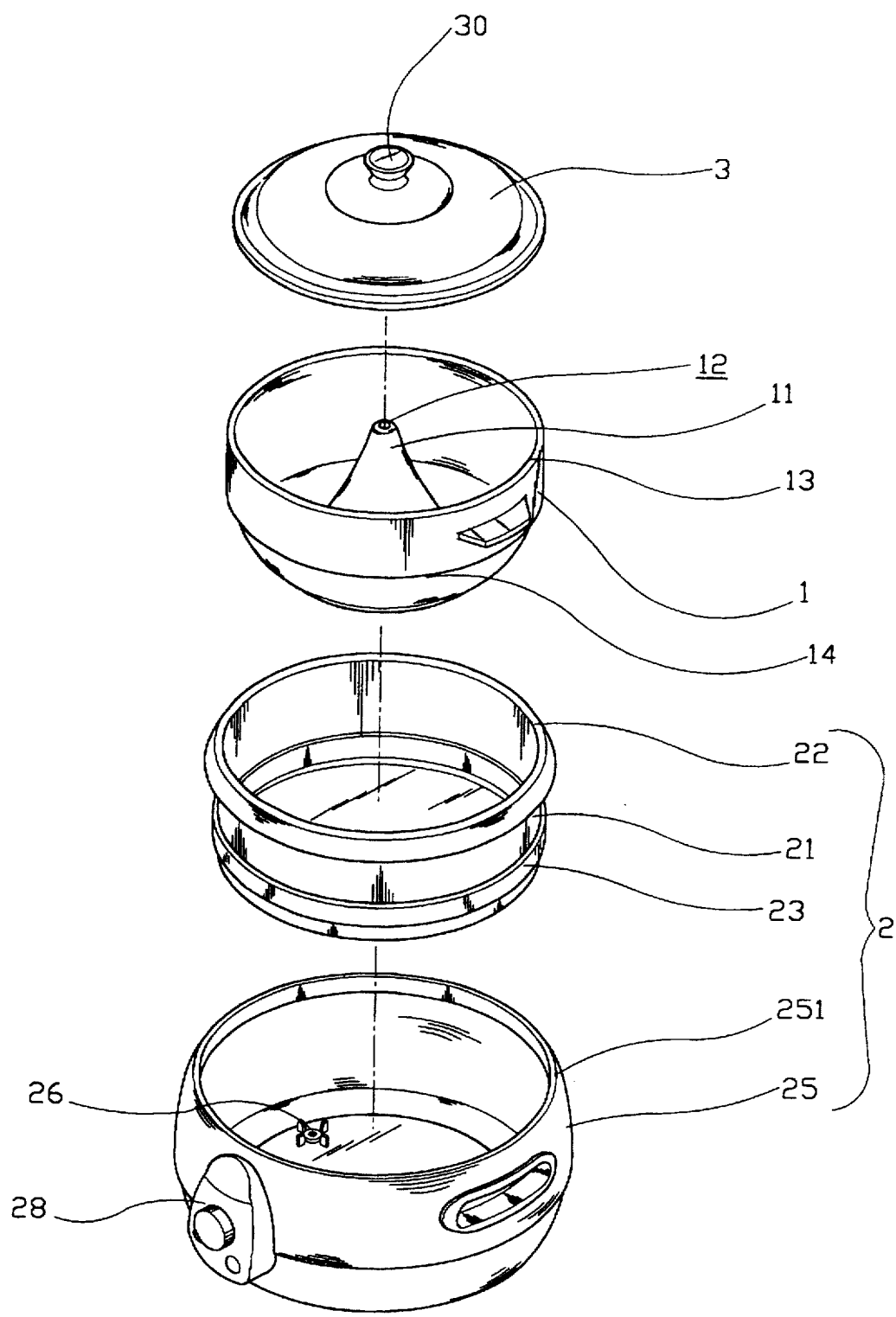
FIG. 2 is an exploded perspective view of the cooking device of the present invention.
Figure 3:
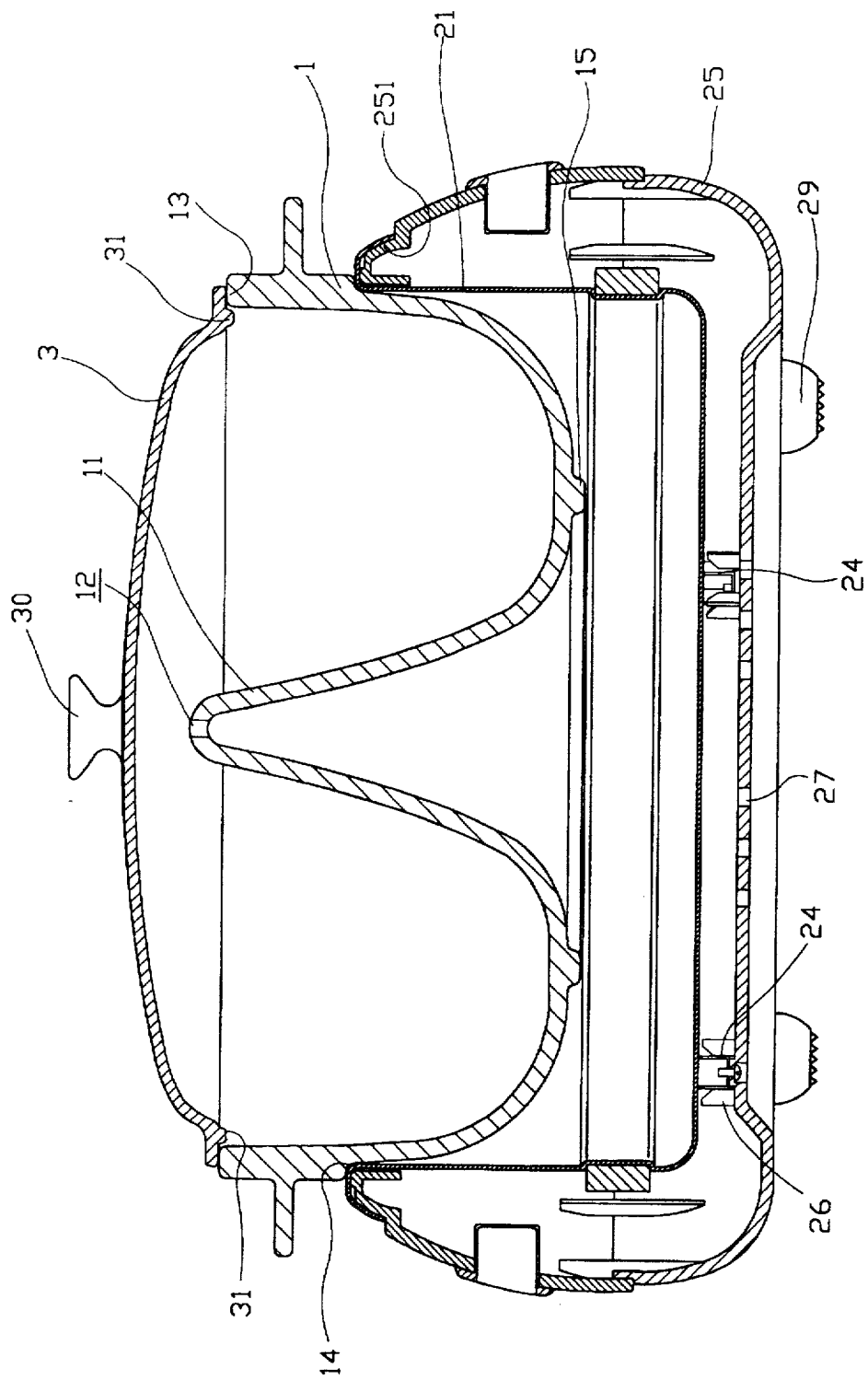
FIG. 3 is a cross-sectional view of the cooking device of the present invention.

With reference to the drawings and in particular to FIGS. 1, 2 and 3, wherein a cooking device constructed in accordance with the present invention is shown, the cooking device of the present invention comprises a food container 1 and a heater 2. The food container 1 receives and holds food to be cooked therein (see FIG. 4) and is to be supported on the top of the heater 2. The heater 2 is for heating water filled and contained therein to generate steam which is then conducted into the food container 1 to cook the food contained therein. The structure of the food container 1 and the heater 2 will be described separately.

The food container 1 comprises a cylindrical casing having an opening on the top side defined by a circumferential top edge 13 of the casing for the entry of food and a bottom side on which a raised portion 11 is formed toward the top opening with a passage extending therethrough to define an exit opening or hole 12 on the raised portion 11. Preferably, the raised portion 11 has a conic configuration tapering toward the top opening with the hole 12 formed at the top thereof. The raised portion 11 has such a height as to have the hole 12 located higher than the edge 13 of the casing. The hole 12 serves as a steam passage and the location of the hole 12 higher than the top opening 13 helps keeping the steam from the hole 12 within the food container 1. Preferably, the conic raised portion 11 is centered within the casing with the hole 12 centered thereon.

The cylindrical casing of the food container 1 comprises a circumferential shoulder 14, see FIG. 3, which is to be supported on a circumferential top edge 22 of a water vessel 21 of the heater 2. The shoulder 14 and the top edge 22 of the water vessel 21 have complementary configuration so as to provide a substantially sealed engagement therebetween, thus defining a sealed space inside the water vessel 21 by means of the food container 1 resting on the top edge 22 of the water vessel 21.

Preferably, the food container 1 has a circumferential rib 15 formed on the bottom thereof which helps separating the food container 1 which may be of a high temperature when the food contained therein is just cooked from for example a table on which the food container 1 may be positioned so as to help protecting the table from being damaged by the high temperature of the food container 1 and also reducing temperature drop inside the food container 1 by being in contact with the lower temperature surface of the table.

A cover 3 is provided to close the top opening 13 of the food container 1, having a hand-holding knob 30 provided thereon for hand holding and carrying the cover 3. The cover 3 has a curved inside surface facing the raised portion 11 of the food container 1 for helping collecting the steam inside the food container 1.

Figure 4:
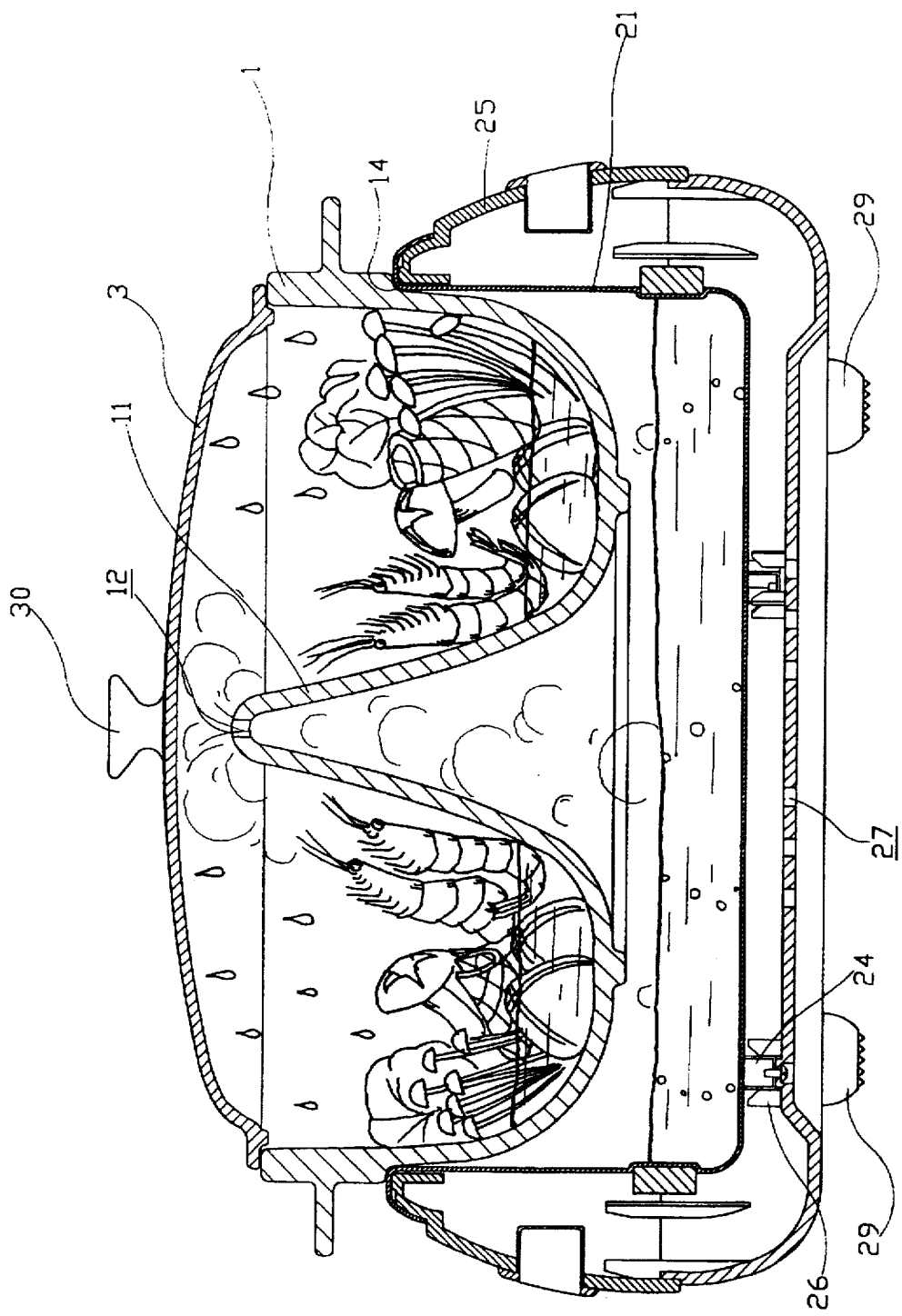
FIG. 4 is a cross-sectional view showing the cooking device in operation.

The cover 3 is also provided with a circumferential flange 31 on the curved inside surface, having an outer diameter substantially corresponding to inside diameter of the top opening 13 of the food container casing for overlapping the top edge 13 of the food container casing and guiding the water droplets condensed from the steam onto the food contained in the food container 1 (see FIG. 4).

The heater 2 comprises a base or holder 25 receiving and supporting the water vessel 21 therein. The water vessel 21 may be made of any temperature and corrosion resistant material that is heat conductive, such as metal, for example stainless steel. Heating means 23, such as resistance heating element, is provided to surround and thus heat the water vessel 21. The water vessel 21 has such a depth that a distance is present between the bottom of the water vessel 21 and the bottom of the food container 1, particularly the bottom rib 15 of the food container 1, thus forming the sealed space between the food container 1 and the water vessel 21 which may receive and contain water therein. The heating means 23 heats the water inside the water vessel 21 and generates steam which is conducted through the hole 12 formed on the conic raised portion 11 of the food container 1.

The water vessel 21 is provided with a plurality of coupling elements 24 which in the embodiment illustrated is three spaced from each other at an angle of 120 degrees to correspond to counterpart coupling elements 26 provided on the bottom of the base 25. Fasteners, such as bolts, may then be used to the secure the coupling elements 24 to the counterpart coupling elements 26 for fixing the water vessel 21 to the base 25, see FIGS. 3 and 4.

Preferably, the top edge 22 of the water vessel 21 has a turndown extension which is intimately fit on a curved top section 251 of the base 25 for tightly supporting the water vessel 21 on the base 25, see FIG. 3.

The base 25 may be provided with ventilation holes 27 (see FIGS. 3 and 4) for ventilation and heat dissipation in order to prevent the interior of the base 25 from being overheated during the operation of the heating means 23. The base 25 is also provided with a controller 28 which includes suitable control circuit and temperature control element coupled to the heating means 23 for controlling the temperature and heat generated by the heating means 23 so as to prevent damage caused by heating an empty water vessel 21 from occurring.

The base 25 is also provided with a plurality of legs 29 for separating the bottom of the base 25 from for example the table on which the cooking device of the present invention is placed in order to maintain air flow in and out of the base 25 through the holes 27 on the bottom thereof.

The operation of the cooking device will be described with reference to FIG. 4. The food to be cooked is first deposited into the food container 1, which may be cleaned chicken, duck or the like with seasoning added therein. A small quantity of water may be added therein. However, there may be no water added at all. Water is then filled into the water vessel 21 of the heater 2 to such a level not higher than the bottom of the food container 1 when the food container 1 is placed on the heater 2 with a distance of at least 5 mm present therebetween. In other words, the surface level of the water contained in the water vessel should be at least 5 mm lower than the bottom of the food container 1.

The food container 1 is then placed in and supported by the water vessel 21 of the heater 2 and the controller 28 is activated to start heating the water inside the water vessel 21. Since a substantially sealed engagement is present between the circumferential shoulder 14 of the food container 1 and the top edge 22 of the water vessel 21, the steam thus generated by heating the water inside the water vessel 21 is not allowed to escape out of the water vessel 21 except the hole 12 formed on the conic raised portion 11 of the food container 1.

The steam that flows through the hole 12 fills into the food container 1, and is constrained therein by the cover 3. When the pressure inside the food container 1 caused by the steam raises to a predetermined level, the steam may partially escape out of the food container 1 by slightly raising and separating the cover 3 from the food container top opening 13. At this moment, the high pressure steam which may has a temperature around 105° C. is generally distributed through the upper portion inside the food container 1 and the food that is placed on the lower portion of the food container 1 and has not yet cooked has a temperature lower than that temperature. The steam thus covers over the food and helps keeping the original taste of the food from being dissipated through the separation of the cover 3 from the food container 1. This makes the food so cooked more delicious.

The steam that flows into the food container 1 becomes condensed on the curved inside surface of the and flows down along the surface in liquid form onto the food that is being cooked makes the food juicy. Since the water that flows into the food is from the condensed steam which in other words is a distilled water, the contaminant that is possibly contained in the water filled into the water vessel 21 is prevented from entering the food so that a cleaner and safer cooked food may be provided.

Although the invention has been described by means of the preferred embodiment thereof, it is apparent to those skilled in the art that many changes, variation and modifications are possible without departing from the scope of the invention as defined in the appended claims.

What is claimed is:

1. A cooking device comprising a heater which receives and supports thereon a food container which is adapted to receive and contain therein food to be cooked, the food container comprising a cylindrical casing having a top opening and a bottom on which a raised portion with a steam passage is formed, the steam passage having an exit opening at a location higher than the top opening of the casing, a cover being provided to close the open top of the casing, the heater comprising a base inside which a water vessel is provided to receive and contain therein a predetermined amount of water, heating means being provided around the water vessel to heat the water therein for generation of steam, the food container being configured to be fit into the water container to define a sealed space therein so that the steam generated inside the water vessel is only allowed to escape out of the water vessel via the steam passage and into the food container to heat and cook the food contained therein and to form a soup with the cooked food when the steam is cooled and condensed into distilled water which mixes with the food.

2. The cooking device as claimed in claim 1, wherein the casing of the food container comprises a circumferential shoulder configured in correspondence to and supported on a circumferential top edge of the water vessel for providing a substantially sealed engagement therebetween to constrain the steam generated inside the water vessel.

3. The cooking device as claimed in claim 1, wherein the predetermined amount of water inside the container has a liquid surface level lower than a bottom of the food container when the food container is supported on the water vessel.

* * * * *